United States Patent
Kim et al.

(10) Patent No.: US 9,386,511 B2
(45) Date of Patent: Jul. 5, 2016

(54) METHOD AND AN APPARATUS FOR ACCESS NETWORK SELECTION IN VISITED NETWORK IN A WIRELESS COMMUNICATION SYSTEM

(71) Applicant: LG ELECTRONICS INC., Seoul (KR)

(72) Inventors: Laeyoung Kim, Seoul (KR); Jaehyun Kim, Seoul (KR); Taehyeon Kim, Seoul (KR); Hyunsook Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/187,017

(22) Filed: Feb. 21, 2014

(65) Prior Publication Data

US 2014/0241333 A1 Aug. 28, 2014

Related U.S. Application Data

(60) Provisional application No. 61/769,134, filed on Feb. 25, 2013, provisional application No. 61/804,163, filed on Mar. 21, 2013, provisional application No. 61/804,721, filed on Mar. 24, 2013, provisional application No. 61/806,949, filed on Apr. 1, 2013.

(51) Int. Cl.
*H04W 48/16* (2009.01)
*H04W 48/18* (2009.01)

(52) U.S. Cl.
CPC .............. *H04W 48/16* (2013.01); *H04W 48/18* (2013.01)

(58) Field of Classification Search
CPC ..... H04W 48/18; H04W 88/06; H04W 48/16; H04W 12/08; H04W 36/0055; H04W 36/385; H04W 72/02; H04W 72/0493; H04W 72/10; H04W 8/08; H04W 8/12; H04L 63/102; H04L 63/20
USPC .......................... 370/254–350; 709/201–213
See application file for complete search history.

(56) References Cited

U.S. PATENT DOCUMENTS 8,644,190 B2 * 2/2014 Sachs et al. ................... 370/254
8,811,201 B2 * 8/2014 Sachs et al. ................... 370/252

* cited by examiner

*Primary Examiner* — Ayaz Sheikh
*Assistant Examiner* — Debebe Asefa
(74) *Attorney, Agent, or Firm* — Lee, Hong, Degerman, Kang & Walmey; Jonathan Kang; Michael Monaco

(57) ABSTRACT

A wireless communication system is disclosed. More particularly, access network selection scheme in visited network in a wireless communication system are disclosed. A method for selecting a Wireless Local Area Network (WLAN) access network by a user equipment (UE) in a visited network may comprise: determining, by the UE, if a selected WLAN access network in the visited network is available; updating, by the UE, a WLAN selection policy with a list of excluded WLAN access network, if the selected WLAN access network in the visited network is not available; and re-determining, by the UE, if there is an available WLAN access network in the visited network based on the updated WLAN selection policy.

10 Claims, 10 Drawing Sheets

FIG. 4
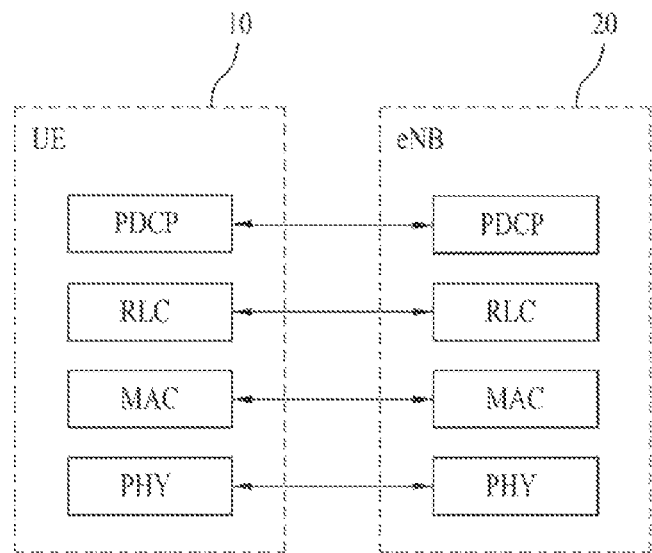
(a)
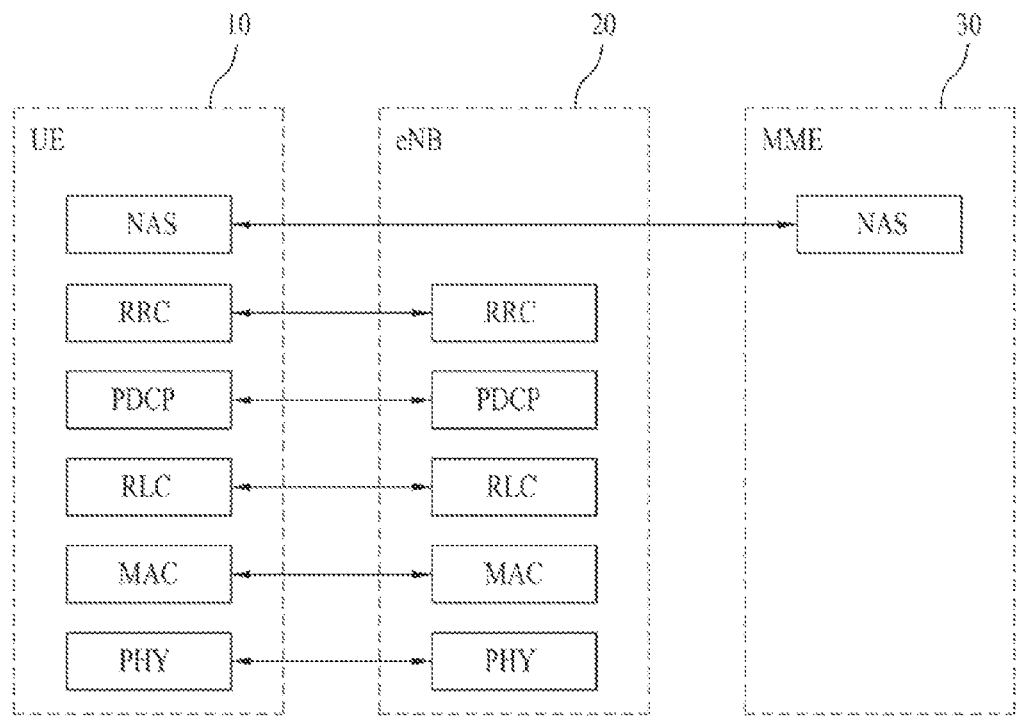
(b)

METHOD AND AN APPARATUS FOR ACCESS NETWORK SELECTION IN VISITED NETWORK IN A WIRELESS COMMUNICATION SYSTEM

CROSS-REFERENCE TO RELATED APPLICATIONS

Pursuant to 35 U.S.C. §119(e), this application claims the benefit of U.S. Provisional Patent Application Ser. Nos. 61/769,134, filed on Feb. 25, 2013, 61/804,163, filed on Mar. 21, 2013, 61/804,721, filed on Mar. 24, 2013, and 61/806,949, filed on Apr. 1, 2013, the contents of which are all hereby incorporated by reference herein in their entirety.

BACKGROUND OF THE INVENTION

1. Field of the Invention

The present invention relates to a wireless communication system, and more particularly, to a method and an apparatus for access network selection in visited network in a wireless communication system.

2. Discussion of the Related Art

Network environments may include a cellular access network (e.g., 3rd Generation Partnership Project (3GPP) Global System for Mobile communication (GSM), Universal Mobile Telecommunication System (UMTS), Evolved Packet System (EPS), etc.) and a wireless local access network (WLAN). To fully and complementarily utilize a dual accessibility to the cellular access network and the WLAN, demands for dual mode terminals are increasing.

Generally, a terminal in a visited network has multiple policies from a home network and from the visited network, and uses the policy from the visited network. However, if a terminal ends up with different visited networks in 3GPP access and WLAN access, it has been defined that the terminal could not use the policies from visited networks. Thus, for a terminal in such environment, access network selection mechanisms for selecting WLAN among accessible WLANs are based on the policy from the home network.

The terminal may be allowed to be served by the WLAN access according to the policy from the home network. Meanwhile, the policy of the visited network is to restrict or forbid terminals being inbound roamers from the WLAN access. In this situation, there may be inconsistency or the visited network may be forced to provide services to the terminal in contrast to its own policies.

SUMMARY OF THE INVENTION

Accordingly, the present invention is directed to a method and an apparatus for access network selection in visited network that obviates one or more problems due to limitations and disadvantages of the related art.

An object of the present invention is to provide a method and an apparatus for access network selection in visited network to provide efficient usage of network resources and to provide enhanced user experiences.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for selecting a Wireless Local Area Network (WLAN) access network by a user equipment (UE) in a visited network may comprise: determining, by the UE, if a selected WLAN access network in the visited network is available; updating, by the UE, a WLAN selection policy with a list of excluded WLAN access network, if the selected WLAN access network in the visited network is not available; and re-determining, by the UE, if there is an available WLAN access network in the visited network based on the updated WLAN selection policy.

In another aspect of the present invention, provided herein is a user equipment (UE) for selecting a Wireless Local Area Network (WLAN) access network in a visited network may comprise: a transceiving module; and a processor. The processor may be configured: to determine if a selected WLAN access network in the visited network is available; to update a WLAN selection policy with a list of excluded WLAN access network if the selected WLAN access network in the visited network is not available; and to re-determine if there is an available WLAN access network in the visited network based on the updated WLAN selection policy.

The following matters are commonly applicable to the embodiments of the present invention.

The WLAN selection policy may be a WLAN selection policy provided by a home network.

The list of excluded WLAN access network) may be provided by the visited network.

The list of excluded WLAN access network may include identification information of at least one WLAN access network.

The at least one WLAN access network may be configured as a forbidden access or a restricted access.

The UE may determine that the selected WLAN access network in the visited network is not available, if a request for connecting to the selected WLAN access network in the visited network is rejected.

The UE may receive a rejection message from the visited network, if the request for connecting to the selected WLAN access network in the visited network is rejected.

The list of excluded WLAN access network may be included in the rejection message.

The determining step may be performed based on a WLAN selection policy of a home network.

The home network may be a home public land mobile network (HPLMN), and the WLAN selection policy of the home network may be provided by a home Access Network Discovery and Selection Function (H-ANDSF).

The UE may have simultaneous connectivity to multiple VPLMNs, and have different VPLMN in 3rd Generation Partnership Project (3GPP) access and WLAN access. The UE may not use a WLAN selection policy provided by a V-ANDSF of a VPLMN in the 3GPP access or a WLAN selection policy provided by a V-ANDSF of a VPLMN in the WLAN access, but the UE may use a WLAN selection policy provided by the H-ANDSF, for the determining step.

The visited network may be a visited public land mobile network (VPLMN), and the WLAN selection policy of the visited network may be provided by a visited Access Network Discovery and Selection Function (V-ANDSF).

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIGS. 4(a) and 4(b) are block diagrams depicting the user-plane protocol and the control-plane protocol stack for the E-UTRAN.

DETAILED DESCRIPTION OF THE INVENTION

Figure 1:
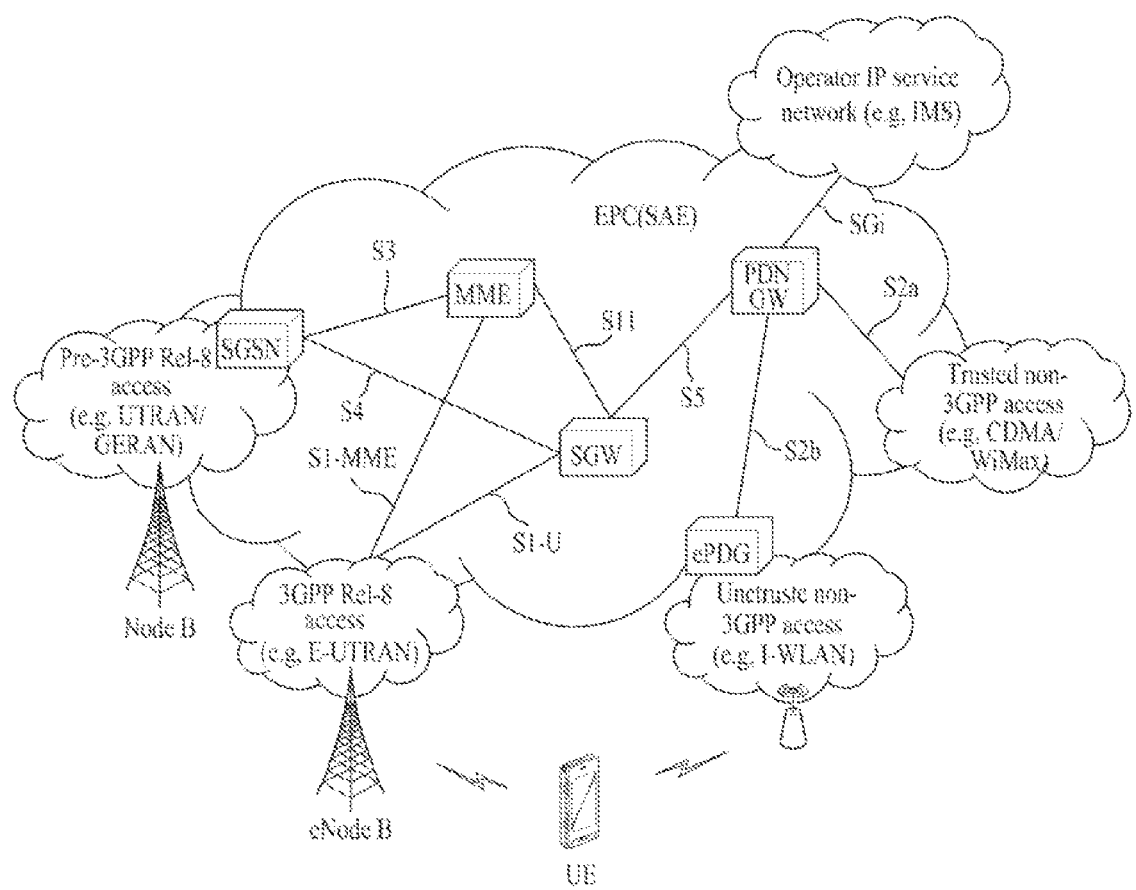
FIG. 1 is a diagram showing the schematic architecture of an evolved packet system (EPS) which includes an evolved packet core (EPC)

The following embodiments are proposed by combining constituent components and characteristics of the present invention according to a predetermined format. The individual constituent components or characteristics should be considered to be optional factors on the condition that there is no additional remark. If required, the individual constituent components or characteristics may not be combined with other components or characteristics. Also, some constituent components and/or characteristics may be combined to implement the embodiments of the present invention. The order of operations to be disclosed in the embodiments of the present invention may be changed to others. Some components or characteristics of any embodiment may also be included in other embodiments, or may be replaced with those of the other embodiments as necessary.

It should be noted that specific terms disclosed in the present invention are proposed for convenience of description and better understanding of the present invention, and the use of these specific terms may be changed to another format within the technical scope or spirit of the present invention.

In some instances, well-known structures and devices are omitted in order to avoid obscuring the concepts of the present invention and the important functions of the structures and devices are shown in block diagram form. The same reference numbers will be used throughout the drawings to refer to the same or like parts.

The embodiments of the present invention can be supported by the standard documents disclosed in any one of wireless access systems, such as an IEEE 802 system, a $3^{rd}$ Generation Partnership Project (3GPP) system, a 3GPP Long Term Evolution (LTE) and LTE-A system, and a 3GPP2 system. That is, the steps or portions, which are not described in order to make the technical spirit of the present invention clear, may be supported by the above documents. In addition, all the terms disclosed in the present document may be described by the above standard documents.

The following technologies may be used in various wireless communication systems. For clarity, 3GPP LTE and 3GPP LTE-A will be focused upon in the following description, but the scope of the present invention is not limited thereto.

Terms used in the present specification are as follows.

UMTS (universal mobile telecommunication system): Third generation mobile communication technology based on global system for mobile communication (GSM) developed by 3GPP.

EPS (evolved packet system): Network system including an evolved packet core (EPC) which is a packet switched (PS) core network based on internet protocol (IP) and an access network such as E-UTRAN, which is evolved from UTRAN.

NodeB: Base station of GERAN/UTRAN, which is mounted outdoors and coverage of which forms a macro cell.

eNodeB: Base station of E-UTRAN, which is mounted outdoors and coverage of which forms a macro cell.

UE: User equipment. The UE may be referred to as a terminal, a mobile equipment (ME), a mobile station (MS), etc. In addition, the UE may be a portable apparatus such as a laptop, a mobile phone, a personal digital assistant (PDA), a smartphone and a multimedia apparatus or a non-portable apparatus such as a vehicle mounted apparatus.

Home NodeB (HNB): Base station of a UMTS network, which is mounted indoors and coverage of which forms a micro cell.

Home eNodeB (HeNB): Base station of an EPS network, which is mounted indoors and coverage of which forms a micro cell.

ANDSF (Access Network Discovery and Selection Function): The ANDSF contains data management and control functionality necessary to provide network discovery and selection assistance data as per operators' policy. The ANDSF is able to initiate data transfer to the UE, based on network triggers, and respond to requests from the UE. It provides functions such as inter-system mobility policy, access network discovery information. The ANDSF in the subscriber's home operator network may interact with other databases such as the HSS user profile information residing in subscriber's home operator network. For details on ANDSF, see 3GPP Technical Specification (TS) 23.402.

MME (mobility management entity): Network node of an EPS network, which performs a mobility management (MM) function and a session management (SM) function.

PDN-GW (packet data network-gateway)/PGW: Network node of an EPS network, which performs a UE IP address allocation function, a packet screening and filtering function and a charging data collection function.

SGW (serving gateway): Network node of an EPS network, which performs mobility anchor, packet routing, idle mode packet buffering, triggering for enabling an MME to page a UE.

PCRF (policy and charging rule function): Network node of an EPS network, which performs policy decision for dynamically applying quality of service (QoS) and charging policy differentiated per service flow.

OAM (operation administration and maintenance): OAM is a set of network administration functions for providing network fault display, performance information, data and diagnostic functions.

NAS (non-access stratum): Upper stratum of a control plane between a UE and an MME. This is a functional layer for signaling between a UE and a core network and exchanging a traffic message in an LTE/UMTS protocol stack, supports UE mobility, and supports a session management procedure for establishing and maintaining an IP connection between a UE and a PDN GW.

NAS configuration MO (NAS configuration management object): MO used to configure parameters associated with NAS functionality with respect to a UE.

PDN (packet data network): Network in which a server supporting a specific service (e.g., a multimedia messaging service (MMS) server, a wireless application protocol (WAP) server, etc.) is located.

PDN connection: Logical connection between a UE and a PDN, which is expressed by one IP address (one IPv4 address and/or one IPv6 prefix).

APN (Access Point Name): String indicating or identifying a PDN. A requested service or a network (PDN) is accessed through a PGW and the APN is the name (string) previously defined in the network in order to find the PGW. For example, the APN may be expressed by internet.mnc012.mcc345.gprs.

RAN (radio access network): Unit including a NodeB, an eNodeB and a radio network controller for controlling the NodeB and the eNodeB in a 3GPP network, which is present between UEs and provides connection to a core network.

HLR (home location register)/HSS (home subscriber server): Database having subscriber information in a 3GPP network. The HSS may perform functions such as configuration storage, identity management and user state storage.

PLMN (public land mobile network): Network configured for the purpose of providing a mobile communication service to individuals. This network may be configured on a per operator basis.

NAS level congestion control: Congestion or overload control function of an EPS network composed of APN based congestion control and general NAS level mobility management control.

MM back-off timer (mobility management back-off timer): Mobility management back-off timer used to control congestion when congestion occurs in a network. While the MM back-off timer runs, a UE is set so as not to perform attach, location information update (e.g., tracking area update (TAU)), routing area update (RAU), service request/extended service request, etc. (in case of an emergency bearer service, a paging response in an existing region, or a multimedia priority service (MPS), even when the MM back-off timer runs, the UE is set to make a request). Regarding operations related to a UE receiving MM back-off timer (e.g., T3346), see 3GPP TS 23.401, TS 23.060, TS 24.301, TS 24.008.

SM back-off timer (session management back-off timer): Session control back-off timer used to control congestion when congestion occurs in a network. While the SM back-off timer runs, a UE is set so as not to perform establishment or change of a session based on an associated APN, etc. (in case of an emergency bearer service or an MPS, even when the SM back-off timer runs, the UE is set to make a request). Regarding operations related to a UE receiving SM back-off timer (e.g., T3396), see 3GPP TS 23.401, TS 23.060, TS 24.301, TS 24.008.

TA (tracking area): Registration area of a UE in an EPS network. The TA is identified by a tracking area identity (TAI).

RA (routing area): Registration area of a UE for a packet core network domain in a GPRS/UMTS network. The RA is identified by a routing area identity (RAI).

Hereinafter, a description will be given based on the above-described terms.

FIG. 1 is a diagram showing the schematic architecture of an evolved packet system which includes an evolved packet core (EPC).

The EPC is a fundamental element of system architecture evolution (SAE) for improving 3GPP performance SAE corresponds to a research project for deciding a network structure supporting mobility between various types of networks. SAE aims to provide an optimized packet-based system which supports various radio access technologies based on IP and provides improved data transfer capabilities.

More specifically, the EPC is a core network of an IP mobile communication system for a 3GPP LTE system and may support a packet-based real-time and non-real-time service. In the existing mobile communication system (that is, a second or third generation mobile communication system), a core network function was implemented through two distinct sub-domains of a voice network (a circuit-switched (CS) network) and a data network (a packet-switched (PS) network). In a 3GPP LTE system which is evolved from the third generation communication system, sub-domains of a CS network and a PS network were unified into one IP domain. That is, in a 3GPP LTE system, a UE having IP capability and a UE may be connected through an IP based base station (e.g., an eNodeB (evolved Node B)), an EPC, an application domain (e.g., an IMS)). That is, the EPC is a structure necessary to implement an end-to-end IP service.

The EPC may include various components. FIG. 1 shows a serving gateway (SGW), a packet data network gateway (PDN GW), a mobility management entity (MME), a serving GPRS (general packet radio service) supporting node (SGSN) and an enhanced packet data gateway (ePDG).

The SGW operates as a boundary point between a radio access network (RAN) and a core network and is an element which performs a function for maintaining a data path between an eNodeB and a PDG GW. In addition, if a UE moves over a region served by an eNodeB, the SGW serves as a local mobility anchor point. That is, packets may be routed through the SGW for mobility in an evolved universal terrestrial radio access network (E-UTRAN) defined after 3GPP release-8. In addition, the SGW may serve as an anchor point for mobility of another 3GPP network (an RAN defined before 3GPP release-8, e.g., UTRAN or GERAN (global system for mobile communication (GSM)/enhanced data rates for global evolution (EDGE) radio access network).

The PDN GW corresponds to a termination point of a data interface for a packet data network. The PDN GW may support policy enforcement features, packet filtering and charging support. In addition, the PDN GW may serve as an anchor point for mobility management with a 3GPP network and a non-3GPP network (e.g., an untrusted network such as an interworking wireless local area network (I-WLAN) and a trusted network such as a code division multiple access (CDMA) or WiMAX network).

Although the SGW and the PDN GW are configured as separate gateways in the example of the network structure of FIG. 1, the two gateways may be implemented according to a single gateway configuration option.

The MME performs signaling and control functions in order to support access to network connection of a UE, network resource allocation, tracking, paging, roaming and handover. The MME controls control plane functions associated with subscriber and session management. The MME manages numerous eNodeBs and signaling for selection of a conventional gateway for handover to other 2G/3G networks. In addition, the MME performs security procedures, UE-to-network session handling, idle UE location management, etc.

The SGSN handles all packet data such as mobility management and authentication of a user for other 3GPP networks (e.g., GPRS networks).

The ePDG serves as a security node for a non-3GPP network (e.g., an I-WLAN, a Wi-Fi hotspot, etc.).

As described with reference to FIG. 1, a UE having IP capabilities may access an IP service network (e.g., an IMS) provided by an operator through various elements in the EPC based on 3GPP access or non-3GPP access.

FIG. 1 shows various reference points (e.g., S1-U, S1-MME, etc.). In the 3GPP system, a conceptual link connecting two functions present in different functional entities of an E-UTRAN and an EPC is defined as a reference point. Table 1 shows the reference points shown in FIG. 1. In addition to the example of Table 1, various reference points may be present according to network structure.

TABLE 1

| Reference point | Description |
| --- | --- |
| S1-MME | Reference point for the control plane protocol between E-UTRAN and MME |
| S1-U | Reference point between E-UTRAN and Serving GW for the per bearer user plane tunneling and inter eNodeB path switching during handover |
| S3 | Reference point between MME and SGSN. Enables user and bearer information exchange for inter 3GPP access network mobility in idle and/or active state. This reference point can be used intra-PLMN or inter-PLMN (e.g. in the case of Inter-PLMN HO). |
| S4 | Reference between SGW and SGSN. Provides related control and mobility support between GPRS Core and the 3GPP Anchor function of Serving GW. In addition, if Direct Tunnel is not established, it provides user plane tunneling. |
| S5 | Reference point for providing user plane tunneling and tunnel management between Serving GW and PDN GW. Used for Serving GW relocation due to UE mobility and if the Serving GW needs to connect to a non-co-located PDN GW for the required PDN connectivity. |
| S11 | Reference point between MME and SGW |
| SGi | Reference point between the PDN GW and the packet data network. Packet data network may be an operator external public or private packet data network or an intra operator packet data network, e.g. for provision of IMS services. This reference point corresponds to Gi for 3GPP accesses. |

Among the reference points shown in FIG. 1, S2a and S2b correspond to a non-3GPP interface. S2a is a reference point for providing associated control between the trusted non-3GPP access and the PDNGW and mobility support to a user plane. S2b is a reference point for providing associated control between the ePDG and the PDN GW and mobility support to a user plane.

Figure 2:
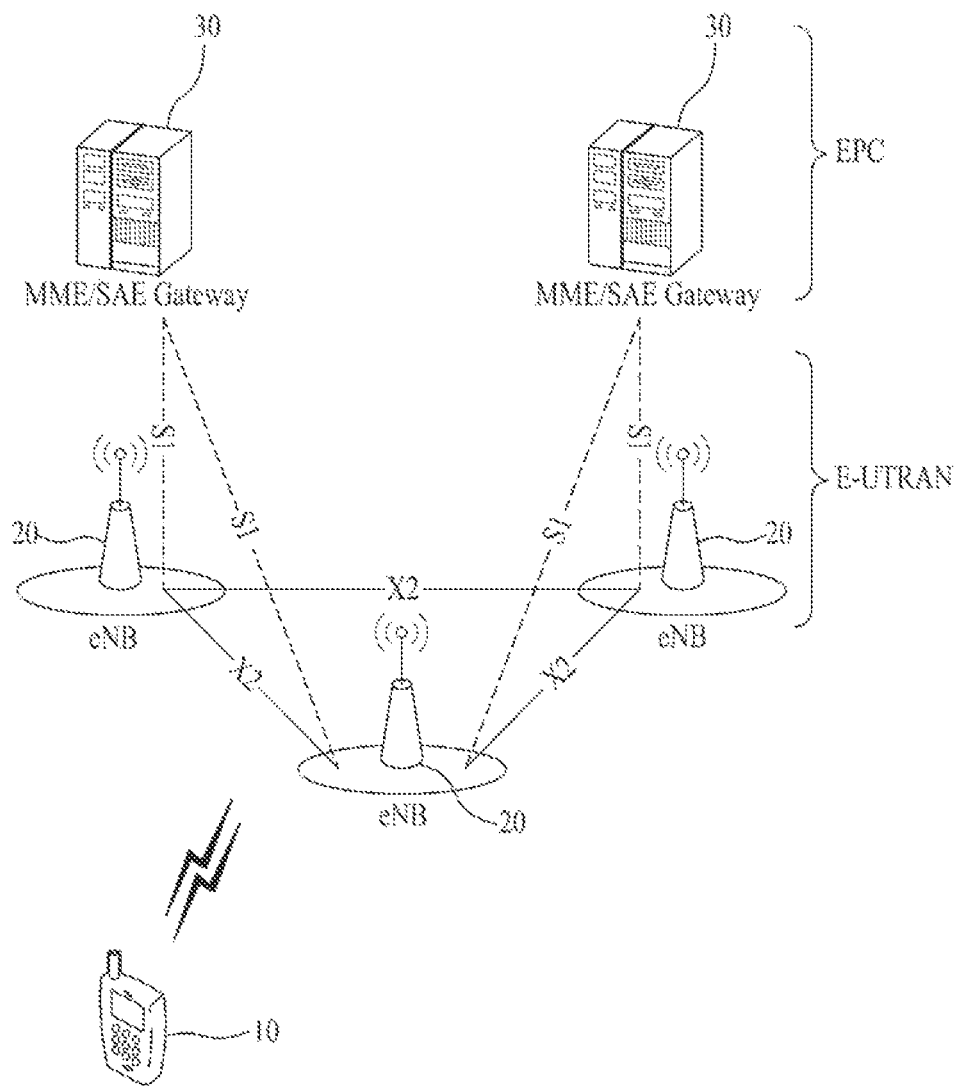
FIG. 2 is a diagram illustrating a network structure of an evolved universal terrestrial radio access network (E-UTRAN) which connects to EPC.

FIG. 2 is a diagram illustrating a network structure of an evolved universal terrestrial radio access network (E-UTRAN) which connects to EPC.

Universal mobile telecommunications system (UMTS) is a 3rd Generation (3G) asynchronous mobile communication system operating in wideband code division multiple access (WCDMA) based on European systems, global system for mobile communications (GSM) and general packet radio services (GPRS). The long-term evolution (LTE) of UMTS has been developed by the 3rd generation partnership project (3GPP) that standardized UMTS.

The 3GPP LTE is a technology for enabling high-speed packet communications. Many schemes have been proposed for the LTE objective including those that aim to reduce user and provider costs, improve service quality, and expand and improve coverage and system capacity. The 3G LTE requires reduced cost per bit, increased service availability, flexible use of a frequency band, a simple structure, an open interface, and adequate power consumption of a UE as an upper-level requirement.

Referring to FIG. 2, the combination of E-UTRAN and EPC may be also referred to as an LTE system or EPS. The communication network is widely deployed to provide a variety of communication services such as voice (VoIP) through IMS and packet data.

As illustrated in FIG. 2, the EPS includes an evolved universal terrestrial radio access network (E-UTRAN), an Evolved Packet Core (EPC) and one or more user equipment. The E-UTRAN may include one or more evolved NodeB (eNodeB) 20, and a plurality of user equipment (UE) 10 may be located in one cell. One or more E-UTRAN mobility management entity (MME)/system architecture evolution (SAE) gateways 30 may be positioned at the end of the network and connected to an external network. SAE gateway includes SGW and PDN GW.

As used herein, "downlink" refers to communication from eNodeB 20 to UE 10, and "uplink" refers to communication from the UE to an eNodeB. UE 10 refers to communication equipment carried by a user and may be also referred to as a mobile station (MS), a user terminal (UT), a subscriber station (SS) or a wireless device.

An eNodeB 20 provides end points of a user plane and a control plane to the UE 10. MME/SAE gateway 30 provides an end point of a session and mobility management function for UE 10. The eNodeB and MME/SAE gateway may be connected via an S1 interface.

The eNodeB 20 is generally a fixed station that communicates with a UE 10, and may also be referred to as a base station (BS) or an access point. One eNodeB 20 may be deployed per cell. An interface for transmitting user traffic or control traffic may be used between eNodeBs 20.

The MME provides various functions including NAS signalling to eNodeBs 20, NAS signalling security, AS Security control, Inter CN node signalling for mobility between 3GPP access networks, Idle mode UE Reachability (including control and execution of paging retransmission), Tracking Area list management (for UE in idle and active mode), PDN GW and Serving GW selection, MME selection for handovers with MME change, SGSN selection for handovers to 2G or 3G 3GPP access networks, Roaming, Authentication, Bearer management functions including dedicated bearer establishment, Support for PWS (which includes ETWS and CMAS) message transmission. The SAE gateway host provides assorted functions including Per-user based packet filtering (by e.g. deep packet inspection), Lawful Interception, UE IP address allocation, Transport level packet marking in the downlink, UL and DL service level charging, gating and rate enforcement, DL rate enforcement based on APN-AMBR. For clarity MME/SAE gateway 30 will be referred to herein simply as a "gateway," but it is understood that this entity includes both an MME and an SAE gateway.

A plurality of nodes may be connected between eNodeB 20 and gateway 30 via the S1 interface. The eNodeBs 20 may be connected to each other via an X2 interface and neighboring eNodeBs may have a meshed network structure that has the X2 interface.

Figure 3:
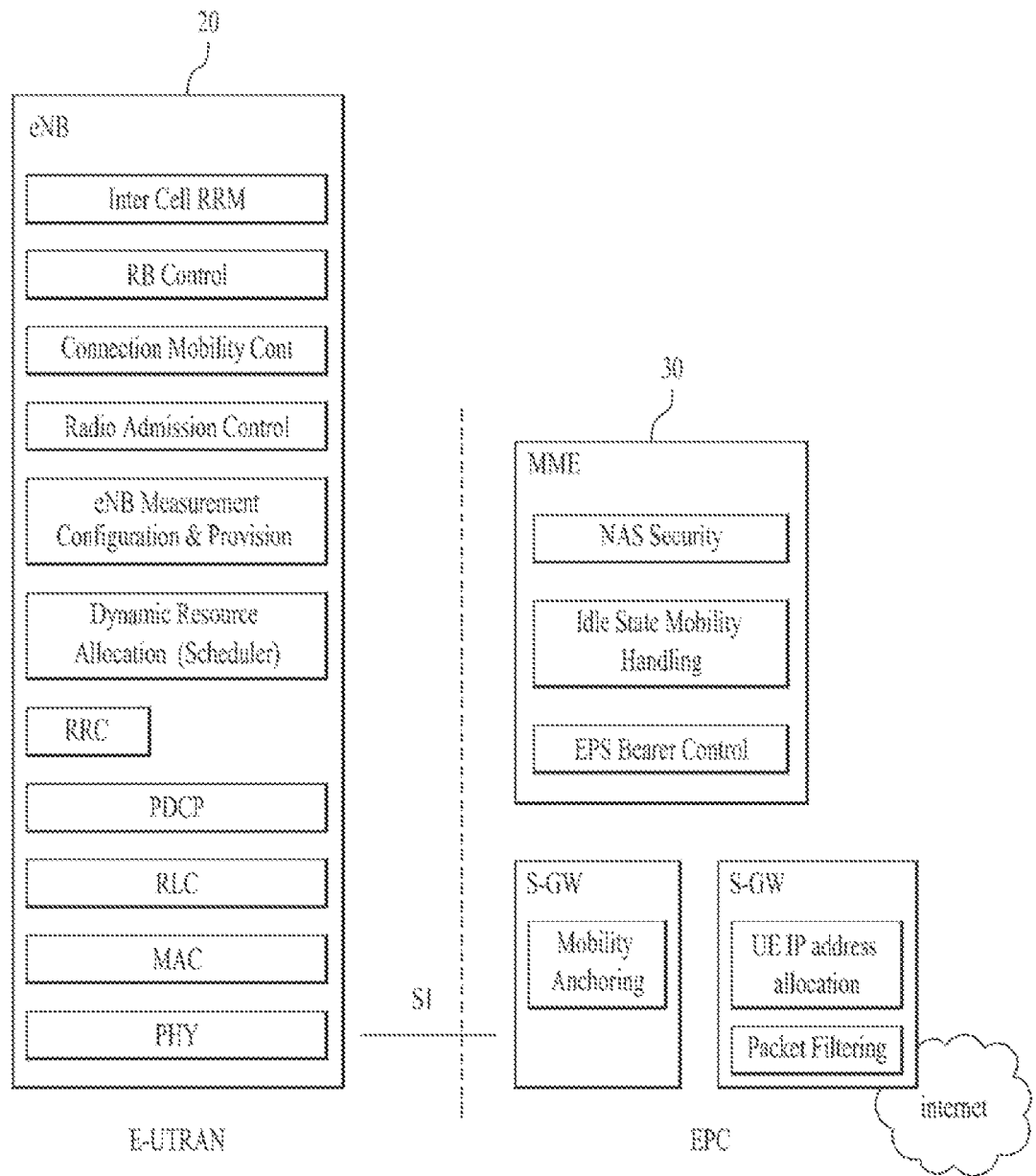
FIG. 3 is a block diagram depicting architecture of a typical E-UTRAN and a typical EPC.

FIG. 3 is a block diagram depicting architecture of a typical E-UTRAN and a typical EPC.

As illustrated, eNodeB 20 may perform functions of selection for gateway 30, routing toward the gateway during a Radio Resource Control (RRC) activation, scheduling and transmitting of paging messages, scheduling and transmitting of Broadcast Channel (BCCH) information, dynamic allocation of resources to UEs 10 in both uplink and downlink, configuration and provisioning of eNodeB measurements, radio bearer control, radio admission control (RAC), and connection mobility control in LTE_ACTIVE state. In the EPC, and as noted above, gateway 30 may perform functions of paging origination, LTE-IDLE state management, ciphering of the user plane, System Architecture Evolution (SAE) bearer control, and ciphering and integrity protection of Non-Access Stratum (NAS) signaling.

FIGS. 4(*a*) and 4(*b*) are block diagrams depicting the user-plane protocol and the control-plane protocol stack for the E-UMTS.

As illustrated, the protocol layers may be divided into a first layer (L1), a second layer (L2) and a third layer (L3) based upon the three lower layers of an open system interconnection (OSI) standard model that is well known in the art of communication systems.

The physical layer, the first layer (L1), provides an information transmission service to an upper layer by using a physical channel. The physical layer is connected with a medium access control (MAC) layer located at a higher level through a transport channel, and data between the MAC layer and the physical layer is transferred via the transport channel. Between different physical layers, namely, between physical layers of a transmission side and a reception side, data is transferred via the physical channel.

The MAC layer of Layer 2 (L2) provides services to a radio link control (RLC) layer (which is a higher layer) via a logical channel. The RLC layer of Layer 2 (L2) supports the transmission of data with reliability. It should be noted that the RLC layer illustrated in FIGS. 4(*a*) and 4(*b*) is depicted because if the RLC functions are implemented in and performed by the MAC layer, the RLC layer itself is not required. The PDCP layer of Layer 2 (L2) performs a header compression function that reduces unnecessary control information such that data being transmitted by employing Internet protocol (IP) packets, such as IPv4 or IPv6, can be efficiently sent over a radio (wireless) interface that has a relatively small bandwidth.

A radio resource control (RRC) layer located at the lowest portion of the third layer (L3) is only defined in the control plane and controls logical channels, transport channels and the physical channels in relation to the configuration, reconfiguration, and release of the radio bearers (RBs). Here, the RB signifies a service provided by the second layer (L2) for data transmission between the UE and the UTRAN.

As illustrated in FIG. 4(*a*), the RLC and MAC layers (terminated in an eNodeB 20 on the network side) may perform functions such as Scheduling, Automatic Repeat Request (ARQ), and Hybrid Automatic Repeat Request (HARQ). The PDCP layer (terminated in eNodeB 20 on the network side) may perform the user plane functions such as header compression, integrity protection, and ciphering.

As illustrated in FIG. 4(*b*), the RLC and MAC layers (terminated in an eNodeB 20 on the network side) perform the same functions for the control plane. As illustrated, the RRC layer (terminated in an eNodeB 20 on the network side) may perform functions such as broadcasting, paging, RRC connection management, Radio Bearer (RB) control, mobility functions, and UE measurement reporting and controlling. The NAS control protocol (terminated in the MME of gateway 30 on the network side) may perform functions such as a SAE bearer management, authentication, LTE_IDLE mobility handling, paging origination in LTE_IDLE, and security control for the signaling between the gateway and UE 10.

The RRC state may be divided into two different states such as a RRC_IDLE and a RRC_CONNECTED. In RRC_IDLE state, the UE 10 may receive broadcasts of system information and paging information while the UE specifies a Discontinuous Reception (DRX) configured by NAS, and the UE has been allocated an identification (ID) which uniquely identifies the UE in a tracking area and may perform PLMN selection and cell re-selection. Also, in RRC-IDLE state, no RRC context is stored in the eNodeB.

In RRC_CONNECTED state, the UE 10 has an E-UTRAN RRC connection and a context in the E-UTRAN, such that transmitting and/or receiving data to/from the network (eNodeB) becomes possible. Also, the UE 10 may report channel quality information and feedback information to the eNodeB.

In RRC_CONNECTED state, the E-UTRAN knows the cell to which the UE 10 belongs. Therefore, the network may transmit and/or receive data to/from UE 10, the network may control mobility (handover and inter-Radio Access Technology (inter-RAT) cell change order to GERAN with Network Assisted Cell Change (NACC)) of the UE, and the network may perform cell measurements for a neighboring cell.

In RRC_IDLE mode, the UE 10 specifies the paging DRX (Discontinuous Reception) cycle. Specifically, the UE 10 monitors a paging signal at a specific paging occasion of every UE specific paging DRX cycle.

The paging occasion is a time interval during which a paging signal is transmitted. The UE 10 has its own paging occasion.

A paging message is transmitted over all cells belonging to the same tracking area. If the UE 10 moves from one tracking area to another tracking area, the UE will send a tracking area update message to the network to update its location.

Figure 5:
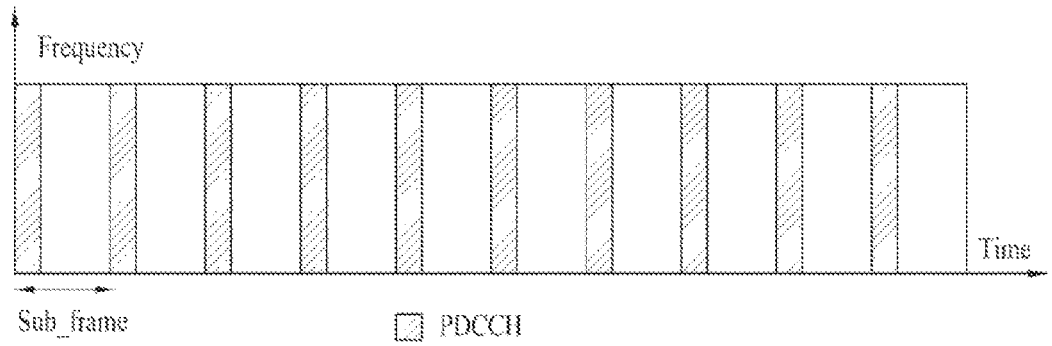
FIG. 5 is a diagram depicting structure of a physical channel.

FIG. 5 is a diagram depicting structure of a physical channel.

A physical channel transfers signaling and data between layer L1 of a UE and eNB. As illustrated in FIG. 5, the physical channel transfers the signaling and data with a radio resource, which consists of one or more sub-carriers in frequency and one more symbols in time.

One sub-frame, which is 1.0 ms. in length, consists of several symbols. The particular symbol(s) of the sub-frame, such as the first symbol of the sub-frame, may be used for downlink control channel (PDCCH). PDCCH carries dynamic allocated resources, such as PRBs and MCS.

A transport channel transfers signaling and data between the L1 and MAC layers. A physical channel is mapped to a transport channel.

Downlink transport channel types include a Broadcast Channel (BCH), a Downlink Shared Channel (DL-SCH), a Paging Channel (PCH) and a Multicast Channel (MCH). The BCH is used for transmitting system information. The DL-SCH supports HARQ, dynamic link adaptation by varying the modulation, coding and transmit power, and both dynamic and semi-static resource allocation. The DL-SCH also may enable broadcast in the entire cell and the use of beamforming. The PCH is used for paging a UE. The MCH is used for multicast or broadcast service transmission.

Uplink transport channel types include an Uplink Shared Channel (UL-SCH) and Random Access Channel(s) (RACH). The UL-SCH supports HARQ and dynamic link adaptation by varying the transmit power and potentially modulation and coding. The UL-SCH also may enable the use of beamforming. The RACH is normally used for initial access to a cell.

The MAC sublayer provides data transfer services on logical channels. A set of logical channel types is defined for different data transfer services offered by MAC. Each logical channel type is defined according to the type of information transferred.

Logical channels are generally classified into two groups. The two groups are control channels for the transfer of control plane information and traffic channels for the transfer of user plane information.

Control channels are used for transfer of control plane information only. The control channels provided by MAC include a Broadcast Control Channel (BCCH), a Paging Control Channel (PCCH), a Common Control Channel (CCCH), a Multicast Control Channel (MCCH) and a Dedicated Control Channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting MBMS control information from the network to a UE. The DCCH is a point-to-point bi-directional channel used by UEs having an RRC connection that transmits dedicated control information between a UE and the network.

Traffic channels are used for the transfer of user plane information only. The traffic channels provided by MAC include a Dedicated Traffic Channel (DTCH) and a Multicast Traffic Channel (MTCH). The DTCH is a point-to-point channel, dedicated to one UE for the transfer of user information and may exist in both uplink and downlink. The MTCH is a point-to-multipoint downlink channel for transmitting traffic data from the network to the UE.

Uplink connections between logical channels and transport channels include a DCCH that may be mapped to UL-SCH, a DTCH that may be mapped to UL-SCH and a CCCH that may be mapped to UL-SCH. Downlink connections between logical channels and transport channels include a BCCH that may be mapped to BCH or DL-SCH, a PCCH that may be mapped to PCH, a DCCH that may be mapped to DL-SCH, and a DTCH that may be mapped to DL-SCH, a MCCH that may be mapped to MCH, and a MTCH that may be mapped to MCH.

It is known that different cause values may be mapped on the signature sequence used to send messages between a UE and eNB and that either Channel Quality Indicator (CQI) or path loss and cause or message size are candidates for inclusion in the initial preamble.

Figure 6:
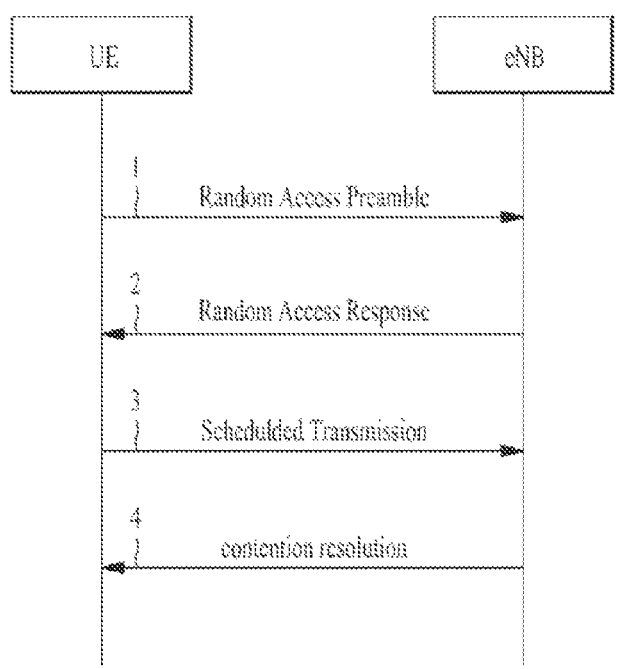
FIG. 6 is a diagram illustrating a random access procedure for E-UTRAN initial access.

FIG. 6 is a diagram illustrating a random access procedure for E-UTRAN initial access.

FIG. 6 illustrates different messages exchanged between a UE and eNB during initial access. When a UE wishes to access the network and determines a message to be transmitted, the message may be linked to a purpose and a cause value may be determined. The size of the ideal message number 3 illustrated in FIG. 6 may also be determined by identifying all optional information and different alternative sizes, such as by removing optional information, or an alternative "scheduling request" message may be used.

The UE acquires necessary information for the transmission of the preamble, UL interference, Pilot Transmit power and required Signal-to-Noise Ratio (SNR) for the preamble detection at the receiver or combinations thereof. This information must allow the calculation of the initial transmit power of the preamble. It is beneficial to transmit the uplink message in the vicinity of the preamble from a frequency point of view in order to ensure that the same channel is used for the transmission of the message.

The UE should take into account the uplink interference and the uplink path loss in order to ensure that the network receives the preamble with a minimum SNR. The uplink interference may be determined only in the eNodeB and, therefore, must be broadcast by the eNodeB and received by the UE prior to the transmission of the preamble. The uplink path loss may be considered to be similar to the downlink path loss and may be estimated by the UE from the received Rx (receiver) signal strength when the transmit power of some pilot sequence of the cell is known to the UE.

The required uplink SNR for the detection of the preamble would typically depend on the eNodeB configuration, such as a number of Rx antennas and receiver performance. There may be advantages to transmitting the rather static Transmit power of the pilot and the necessary uplink SNR separately form the varying uplink interference and possibly the power offset required between the preamble and the message.

The initial transmission power of the preamble may be roughly calculated according to the following formula: [Transmit power=TransmitPilot−RxPilot+ULInterference+ Offset+SNRRequired].

Therefore, any combination of SNRRequired, ULInterference, TransmitPilot and Offset may be broadcast. In principle, only one value must be broadcast. This is essentially the method in current UMTS systems, although the UL interference in LTE will mainly be neighboring cell interference that is probably more constant than in UMTS.

The UE determines the initial uplink transmit power for the transmission of the preamble as explained above. The receiver in the eNB is able to estimate the absolute received power as well as the relative received power compared to the interference in the cell. The eNB will consider a preamble detected if the received signal power compared to the interference is above an eNB known threshold.

The UE performs power ramping in order to ensure that a UE may be detected even if the initially estimated transmission power for the preamble is not adequate. Another preamble will most likely be transmitted if no acknowledgement or a negative acknowledgement is received by the UE before the next random access attempt. The transmit power of the preamble may be increased, and/or the preamble may be transmitted on a different uplink frequency in order to increase the probability of detection. Therefore, the actual transmit power of the preamble that will be detected does not necessarily correspond to the initial transmit power of the preamble as initially calculated by the UE.

The UE must determine the possible uplink transport format The transport format, which may include Modulation and Coding Scheme (MCS) and a number of resource blocks that should be used by the UE, depends mainly on two parameters, specifically the SNR at the eNB and the required size of the message to be transmitted.

In practice, a maximum UE message size, or payload, and a required minimum SNR correspond to each transport format. In UMTS, the UE determines before the transmission of the preamble whether a transport format can be chosen for the transmission according to the estimated initial preamble transmit power, the required offset between preamble and the transport block, the maximum allowed or available UE transmit power, a fixed offset and additional margin. The preamble in UMTS need not contain any information regarding the transport format selected by the UE since the network does not need to reserve time and frequency resources and, therefore, the transport format is indicated together with the transmitted message.

The eNB must be aware of the size of the message that the UE intends to transmit and the SNR achievable by the UE in order to select the correct transport format upon reception of the preamble and then reserve the necessary time and frequency resources. Therefore, the eNB cannot estimate the SNR achievable by the UE according to the received preamble because the UE transmit power compared to the maximum allowed or possible UE transmit power is not known to the eNB, given that the UE will most likely consider the measured path loss in the downlink or some equivalent measure for the determination of the initial preamble transmission power.

The eNB could calculate a difference between the path loss estimated in the downlink compared and the path loss of the uplink. However, this calculation is not possible if power ramping is used and the UE transmit power for the preamble does not correspond to the initially calculated UE transmit power. Furthermore, the precision of the actual UE transmit power and the transmit power at which the UE is intended to transmit is very low. Therefore, it has been proposed to code the path loss or CQI estimation of the downlink and the message size or the cause value in the uplink in the signature.

Figure 7:
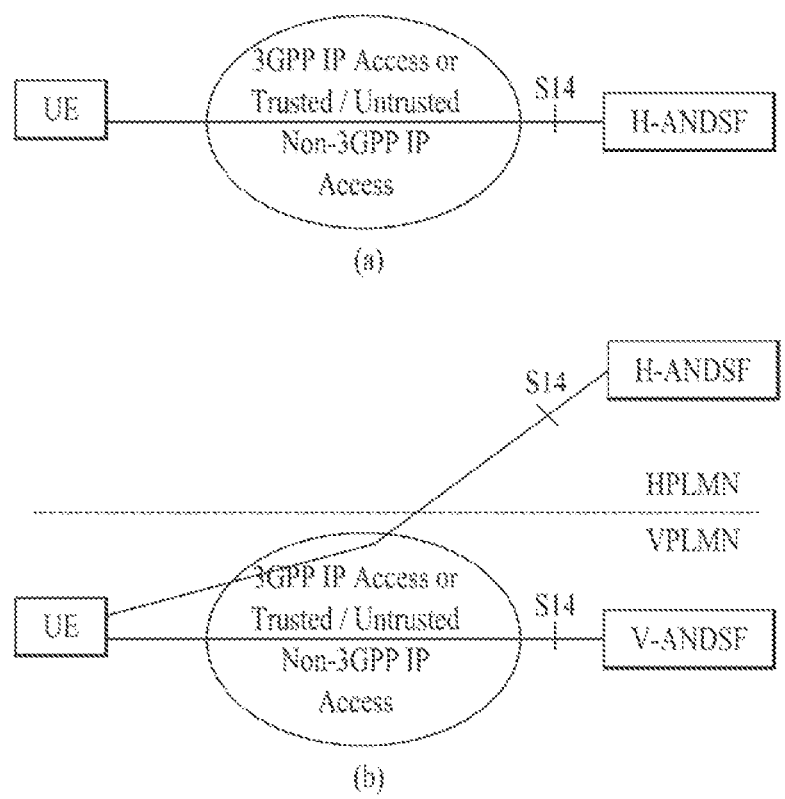
FIGS. 7(a) and 7(b) are block diagrams depicting architectures used for access network discovery and selection.

FIGS. 7(a) and 7(b) are block diagrams depicting architectures used for access network discovery and selection.

FIG. 7(a) illustrates a non-roaming architecture for Access Network Discovery and Selection Functions (ANDSF). FIG. 7(b) illustrates a roaming architecture for ANDSF.

The architecture is based on a new network element called Access Network Discovery and Selection Function (ANDSF). An ANDSF element located in the home PLMN (HPLMN) of a UE is referred to as the Home-ANDSF (H-ANDSF) for this UE, whereas an ANDSF element located in the visited PLMN (VPLMN) of a UE is referred to as the Visited-ANDSF (V-ANDSF) for this UE. Unless otherwise specified, the term ANDSF is used to refer to both an H-ANDSF and a V-ANDSF. In the examples of FIGS. 7(a) and 7(b), the support and the use of these functions and interfaces are optional.

Access Network Selection

In this document, the term "a cellular access network" may refer to a cellular radio access network or a core network such as EPC. A cellular access network may be exemplified by, but not limited to a 3GPP access network such as GERAN, UTRAN, E-UTRAN, or a 3GPP2 access network such as CDMA1x, HRPD.

WLAN access network may be exemplified by, but not limited to a WLAN access network according to 802.11 series, or Hotspot 2.0.

A dual mode terminal may support accessibility to both of a cellular access network and a WLAN. The term "a dual mode terminal" may refer to a terminal having a capability of routing traffic (e.g. IP traffic) simultaneously to a cellular access network and to a WLAN access network, or a terminal having a capability of routing traffic either to a cellular access network or to a WLAN access network.

Standardization of WLAN Network Selection for 3GPP Terminals (WLAN_NS) are developing as a work item of 3GPP Release-12. WLAN_NS studies solutions for enhanced WLAN network selection for a dual mode terminal supporting a cellular access network and a WLAN access network.

One of key issues of WLAN_NS is a simultaneous connectivity to multiple VPLMNs. For a terminal being simultaneously connected to multiple VPLMNs, it is required to determine a policy to be applied for a terminal in a visited network (e.g., a terminal in roaming state).

As described in TS 24.234, the network and PLMN selection in WLAN is independent if PLMN selection that is performed in 3GPP access: "Network selection procedure is completely independent of the result of the PLMN selection under other radio access technologies that are specified in 3GPP TS 23.122". There is thus the possibility that a UE simultaneously connected to both 3GPP access and WLAN access selects different VPLMN in the two accesses.

For the case of ePDG selection, the procedures defined in TS 24.302 and TS 23.402 can result in one of the following options: i) If the UE is attached to a VPLMN in 3GPP access, the UE may either find an ePDG in the VPLMN used in 3GPP access or an ePDG in HPLMN; ii) If the UE is attached to HPLMN in 3GPP access, the UE finds an ePDG in HPLMN; iii) If the UE is not attached in 3GPP access, the UE may either find an ePDG in the VPLMN selected in WLAN access or an ePDG in HPLMN. The ePDG selection procedure can result in an ePDG located in VPLMN selected for 3GPP access, in VPLMN selected for WLAN access or in HPLMN.

Figure 8:
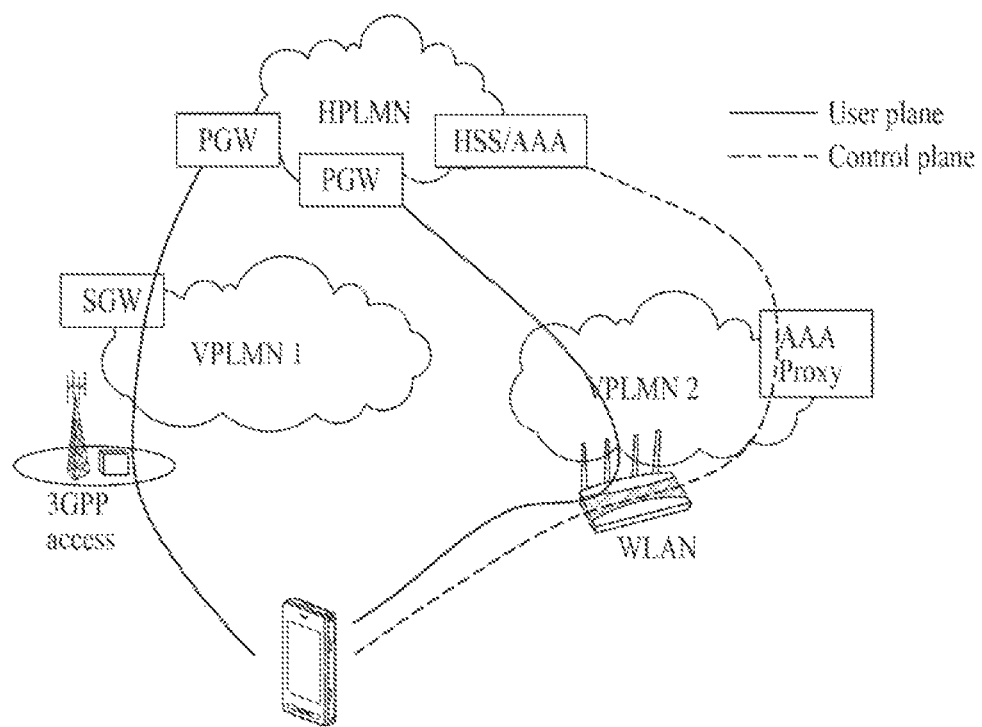
FIG. 8 and FIG. 9 show exemplary scenarios with different VPLMN in 3GPP access and WLAN access.
Figure 9:
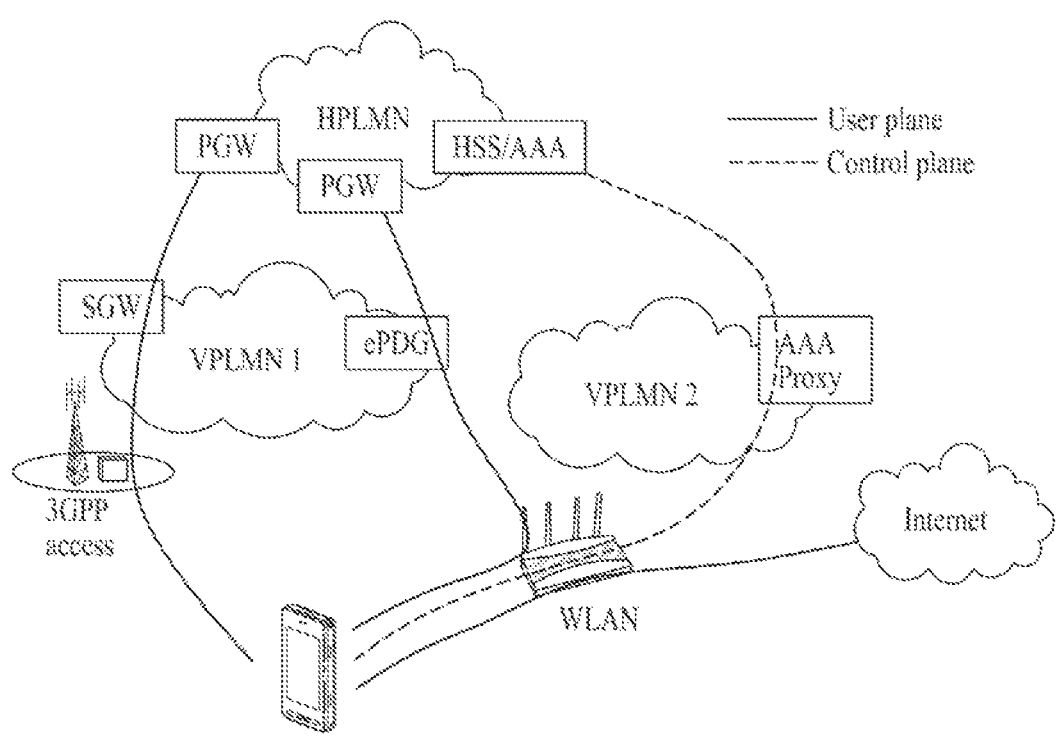

FIG. 8 and FIG. 9 show exemplary scenarios with different VPLMN in 3GPP access and WLAN access.

Referring to FIG. 8, the UE ends up with different VPLMN in 3GPP access and WLAN access. This scenario may happen when UE attaches in both 3GPP and WLAN access and the PLMN selection procedures end up in separate VPLMN (e.g., in SaMOG (S2a Mobility based on GPRS Tunnelling Protocol (GTP) and WLAN access to the EPC network) case).

Referring to FIG. 9, the UE ends up with different VPLMN in 3GPP access and WLAN access, and ePDG selected in 3GPP VPLMN. This scenario may happen when UE first attaches in 3GPP, then attaches in WLAN access and then finds an ePDG in 3GPP VPLMN.

The scenario with multiple simultaneous serving PLMNs has not been sufficiently addressed in 3GPP. For a roaming UE in such a scenario, issues that may need further resolution include: i) Is the scenario described above valid or should it be avoided, e.g. by appropriate specification changes? ii) Even though mobility and routing policies from H-ANDSF should as of today not impact the PLMN selection procedures, it is not clear if policies from H-ANDSF policies apply since an access change would also result in PLMN change. It is not clear if policies from any of the two V-ANDSFs can apply in such a scenario.

Therefore, there is a need to clarify (V-)ANDSF usage (e.g. which ANDSF is used at each mobility/selection step) and other aspects related to scenarios where a UE is served by different VPLMN in 3GPP access and WLAN access.

Recently, Technical Report (TR) 23.865v0.5.0 provides a solution for the aforementioned usage of ANDSF policies in (V)-PLMN.

An ANDSF server provides policy towards a given UE in order for that UE to be able to use more extensive decision-making criteria when determining which access the UE should connect to.

A V-ANDSF server associated with a given VPLMN could be used to download access network selection policies to determine the best access network associated to a given VPLMN. This implies that a V-ANDSF server, belonging to Operator X, may provide policies towards a UE belonging to Operator Y. The current solution is that the UE reconciles the policies from V-ANDSF and H-ANDSF and, if there is overlap, gives precedence to policies from the V-ANDSF.

As described in the key issue of the simultaneous connectivity to multiple VPLMNs, the UE may be connected to two different VPLMNs simultaneously, one in 3GPP access and one in WLAN access. For these scenarios the UE may potentially receive policies from two V-ANDSF servers, one in each VPLMN. It is not clear which V-ANDSF, if any, shall be used for the policy information or if one of the V-ANDSF servers has precedence over the other one.

As per proposed solution, 3GPP system will be enhanced to allow the V-ANDSF policies to be taken into account for the case when both 3GPP and non-3GPP accesses connect via the same VPLMN. For this solution, the UE in case of the simultaneous connectivity to multiple VPLMNs as in FIG. 8 could not use the V-ANDSF in VPLMN1 or VPLMN2, while the UE in case of the simultaneous connectivity to multiple VPLMNs as in FIG. 9 could use the V-ANDSF for both accesses in VPLMN1. The UE can accept policies received from the V-ANDSF server only if the UE has single selected VPLMN for all attached accesses.

The above solution still requires refinement taking into account an inconsistency between policies from V-ANDSF and H-ANDSF. Conventionally (i.e., before 3GPP release-12), in case of connectivity to a single VPLMN, a UE uses or prioritizes a policy from the V-ANDSF if the UE receives both of a policy from H-ANDSF (e.g., a policy configured by HPLMN to the UE, or a policy received by the UE from the H-ANDSF) and a policy from V-ANDSF. In case of simultaneous connectivity to multiple VPLMNs, if a UE has different VPLMN in 3GPP access and WLAN access, the UE could not use the V-ANDSF in VPLMN1 or VPLMN2, but should use the H-ANDSF. In this case, inconsistency between policies from V-ANDSF and H-ANDSF may cause a problem in a visited network.

For example, it may be assumed a situation that a roaming UE (i.e., a UE (or a user, or a subscriber) in visited network) has simultaneous connectivity to VPLMN1 and VPLMN2 and is connected to a WLAN access, and a V-ANDSF of one of the multiple VPLMNs which operates the WLAN access (e.g., VPLMN1 to which the WLAN access belongs) provides a policy that the WLAN access is set as restricted access or forbidden, while a H-ANDSF of a HPLMN of the UE provides a policy that there is no restriction for WLAN access. The restricted access or the forbidden access is defined as the Table 2 for all WLAN access networks or a specific WLAN access network. In table 2, values are for AccessNetworkPriority leaf as defined in TS 24.312.

TABLE 2

| Value | Description |
|---|---|
| 0 | Reserved |
| 1-250 | Priority value |
| 251-253 | Reserved |
| 254 | Restricted access. This access should be avoided if the current rule is active. |
| 255 | Forbidden. UE is not allowed to use this access if the current rule is active. |

In this situation, according to the conventional solution, the UE could not use the V-ANDSF in VPLMN1 or VPLMN2, but uses the H-ANDSF, thus the UE is allowed to be served by the WLAN access. VPLMN1, which restricts or forbids the UE from the WLAN access, should provide services to the UE in contrast to its own policies.

Such exemplary situation may be occurred when the VPLMN1 has WLAN#1, WLAN#2 and WLAN#3, and makes a policy that only the subscribers to its own PLMN are allowed to use or access the WLAN#1, WLAN#2 and WLAN#3 but inbound roamers are considered as restricted or forbidden to use or access the WLAN#1, WLAN#2 and WLAN#3. In addition, information on restricted or forbidden access for the WLAN#1, WLAN#2 and WLAN#3 are reflected to a policy of an ANDSF of VPLMN1, but are not yet reflected to a policy of an ANDSF of other PLMNs (including HPLMN of the inbound roamer to the VPLMN1).

To address such inconsistency between policies of inconsistency between policies from V-ANDSF and H-ANDSF, for example in case of simultaneous connectivity to multiple VPLMNs, an advanced mechanism of access network selection is proposed. Various embodiments of the proposed mechanism will be described.

One or more of the embodiments may be applied independently or in combination, for a UE currently connected to (hereinafter, "connect to" may refer to "associate with" or "having an access to" unless described otherwise) a WLAN access network of a visited network (e.g., VPLMN1), or for a UE being about to connect to a WLAN access network (i.e., an available WLAN access network) of the VPLMN1. In addition, it is assumed that the UE (e.g., a dual mode terminal) is connected to a cellular access network of the VPLMN1, or is connected to a cellular access network of another VPLMN (e.g., VPLMN2). It is also assumed that the UE has received or has not received a policy from V-ANDSF of the VPLMN1 when applying the following embodiments.

Embodiment 1

If a policy provided by a V-ANDSF of the VPLMN1 indicates that the currently connected WLAN access network or an available WLAN access network (or a WLAN access network which has selected to associate) is a forbidden access (or a not-allowed access), the UE uses (or applies, or follows) a policy provided by the V-ANDSF.

If a policy provided by a V-ANDSF of the VPLMN1 indicates that the currently connected WLAN access network or an available WLAN access network (or a WLAN access network which has selected to associate) is a restricted access (or an avoided access), the UE uses (or applies, or follows) a policy provided by the V-ANDSF.

Consequently, the UE may perform at least one of the following operations i)-iv) for IP flow(s) and/or PDN connection(s) which is to be served using the WLAN access network.

i) The UE may select another WLAN access network of the same PLMN as the currently connected WLAN access network or an available WLAN access network (or a WLAN access network which has selected to associate).

ii) The UE may select another WLAN access network of a PLMN different from the PLMN of the currently connected WLAN access network or an available WLAN access network (or a WLAN access network which has selected to associate).

iii) The UE may select another type of access network or access technology (e.g., 3GPP access network). For example, the UE may select 3GPP access network to which the UE is connected.

iv) The UE may maintain connection to the WLAN access network to which the UE is already connected. In addition, at a point of time when the UE cannot be served by the WLAN access network or when the UE should apply a policy related to access network selection, the UE uses (or applies, or follows) a policy provided by the V-ANDSF of VPLMN1.

The policy provided by the V-ANDSF of the VPLMN1 may include information indicating whether the UE should immediately release connection to the WLAN access network (e.g., applying the operation of i), ii) or iii)) or the UE is allowed to maintain the WLAN access network for a while (e.g., applying the operation of iv)), when the WLAN access network or the available WLAN access network (or a WLAN access network which has selected to associate) is configured as restricted access or forbidden access by the VPLMN1.

The UE may perform at least one of the following operations of a)-e), when the UE uses (or applies, or follows) a policy provided by the V-ANDSF of VPLMN1. In addition, implicit or explicit information being a basis of determining or using the at least one of operations of a)-e) may be provided by the H-ANDSF and/or the V-ANDSF. Additionally or alternatively, information being a basis of determining or using the at least one of operations of a)-e) may be configured with the UE.

a) The UE may apply the policy provided by the V-ANDSF to any type of access network selection or any type of access technology selection.

b) The UE may apply the policy provided by the V-ANDSF only to WLAN access network selection. For other types of access network selection (e.g., 3GPP access network selection), the UE may apply a policy provided by the H-ANDSF, or apply a policy provided by a V-ANDSF of a VPLMN to which a UE-connected 3GPP access network belongs.

c) The UE may use the policy provided by the V-ANDSF only for the purpose of checking if the currently connected WLAN access network or an available WLAN access network (or a WLAN access network which has selected to associate) is configured as a restricted access/a forbidden access. Here, the UE may basically use a policy provided by the H-ANDSF or a policy provided by a V-ANDSF of a VPLMN to which a UE-connected 3GPP access network belongs. For example, the UE basically uses the policy provided by the H-ANDSF, and if the policy from the H-ANDSF indicates that a WLAN access network is preferred for an IP flow#1, then the UE attempts to connect to a WLAN access network. If the UE attempts to connect to WLAN#1 of VPLMN1, the UE may use the policy from the V-ANDSF of VPLMN1 to check if the WLAN#1 is configured as a forbidden access or a restricted access for the UE. Additionally, the UE may attempt to connect to a WLAN access network in another PLMN (e.g., VPLMN2) to which a UE-connected 3GPP access network belongs. In this case, the UE basically follows the policy from the H-ANDSF, and uses the policy from the V-ANDSF of the VPLMN2 to check if the connected WLAN access network or an available WLAN access network is configured as a forbidden access or a restricted access for the UE. To sum, in case a PLMN that provides the UE with the policy that the UE basically follows and a PLMN to which a UE-connected/selected/available WLAN(s) for WLAN access network selection belongs are different, the UE may use the policy provided by the PLMN to which the UE-connected/selected/available WLAN(s) belongs for checking the candidate WLAN(s) is configured as a forbidden access or a restricted access for the UE.

d) The UE may use a policy provided by the H-ANDSF for WLAN access selection (e.g., information related to prioritized access or information related to WLAN preference), while using a policy provided by the V-ANDSF (e.g., information related to prioritized access or information related to WLAN preference) to check if the UE-connected/selected/available WLAN access network is a forbidden access or a restricted access for the UE. For other matters, the policy from the H-ANDSF and the policy from the V-ANDSF may be used or applied in various forms of combination. The information related to prioritized access or the information related to WLAN preference may include information related to prioritized access, preferred access, restricted access and/or forbidden access.

e) The UE may basically use a policy provided by the H-ANDSF. If there are not any available/selectable WLAN access networks according to the policy provided by the H-ANDSF, then the UE may use a policy provided by the V-ANDSF for WLAN access network selection.

For a UE-connected/selected/available WLAN access network, a restricted access configuration or a forbidden access configuration may be static, or may be dynamic according to a condition of the network. For example, V-ANDSF may configure a WLAN access network as forbidden access in case of the WLAN access network being overloaded or congested. If the WLAN access network is not overloaded or congested any more, the V-ANDSF may release the forbidden access configuration or may configure the WLAN access network as an available access or a prioritized access.

In addition, if the UE selects a WLAN access network belongs to a VPLMN, before connecting to (or associating with) the WLAN access network, the UE may perform operations to obtain policy (or related information) from a V-ANDSF of the VPLMN to which the WLAN access network belongs.

Embodiment 2

When a UE requests authentication/authorization during attempting to connect to a WLAN access network, an AAA (Authentication/Authorization/Accounting) proxy server of a VPLMN to which the WLAN access network belongs may respond with a rejection (or a refusal to accept, or a failure) in response to a request for authentication/authorization. Consequently, the UE may not connect to the WLAN access network.

The AAA proxy server may include a reject code (or an error code, or a result code, or a cause) information in a response message in order to prevent the UE from connecting to the WLAN access network. Accordingly, the UE received the response message may not attempt to re-connect the WLAN access network.

Additionally or alternatively, the AAA proxy server may include, in a response message, information on a list of WLAN access network(s) which should be excluded or prohibited from a WLAN access network selection among WLAN access networks of a PLMN to which the AAA proxy server belongs. The information on the excluded WLAN access network(s) may include a WLAN access network(s)

configured as a forbidden access for the UE, and/or a WLAN access network(s) configured as a restricted access for the UE. The UE received the information on the excluded WLAN access network(s) may not attempt to connect to or re-connect to the excluded WLAN access network(s). The UE may store the information on the excluded WLAN access network(s) or information on the rejected/refused/failed WLAN access networks(s).

The response message from the AAA proxy server may be delivered to the UE as it is or in a modified form via the WLAN access network (or a trusted WLAN access network including the WLAN access network, or an untrusted non-3GPP access network including the WLAN access network).

AAA proxy server may determine to reject a request for connection to the WLAN access network of the UE based on one or more of the following information, but not limited thereto.

Whether the WLAN access network to which the UE/subscriber/user is connected or is about to connect is a forbidden access for the UE/subscriber/user.

Whether WLAN access network to which the UE/subscriber/user is connected or is about to connect is a restricted access for the UE/subscriber/user.

Local policy, operator's policy, local information, local configuration.

Access Network Identity (ANID) information (e.g., information indicating whether an access network corresponding to the ANID is WLAN access network or not) provided in a request for authentication/authorization (or included in a request message for authentication/authorization).

Access Type information (e.g., information indicating whether the Access Type of an access network is WLAN access network or not) provided in a request for authentication/authorization (or included in a request message for authentication/authorization).

ID information of a WLAN access network provided in a request for authentication/authorization (or included in a request message for authentication/authorization).

Non-Seamless WLAN Offload (NSWO) related information (e.g., information indicating whether a trusted WLAN access network (TWAN) supports NSWO or not) provided in a request for authentication/authorization (or included in a request message for authentication/authorization).

ID information of the UE/subscriber/user.

Subscription information.

Roaming agreement information with a HPLMN of the UE.

Load/overload/congestion status information of a WLAN access network to which the UE/subscriber/user is connected or is about to connect.

Load/overload/congestion status information of all connectable (or associable, or available) WLAN access network(s).

As described above, the UE selects or reselects a WLAN access network based on a WLAN selection policy which includes a list of excluded or prohibited WLAN access network(s). The list of excluded or prohibited WLAN access network(s) may be provided to the UE from or via a network node which generates, stores or delivers policy information, such as AAA proxy, ANDSF, PCRF and so on.

The UE may be in roaming state (or in a visited network) when applying the WLAN selection mechanism using the list of excluded or prohibited WLAN access network(s). The list of excluded or prohibited WLAN access network(s) may include identifier(s) (e.g., service set identification(s), SSID (s)) of the WLAN access network(s) not preferred for selection/reselection.

The WLAN selection policy is a set of operator-defined rules that determines how the UE selects and reselects a WLAN access network. A WLAN access network selection criterion may take into account the list of excluded or prohibited WLAN access network(s).

The UE may be provisioned with multiple valid WLAN selection policy (WLANSP) rules. For example, a UE may have valid rules from both HPLMN and VPLMN, when it is roaming.

In this case, the UE may be configured to use WLANSP rule provided by HPLMN to determine if there is available WLAN access network(s). For example, referring to FIG. 8 which depicts simultaneous connectivity to multiple VPLMNs, if a UE has different VPLMN in 3GPP access and WLAN access, the UE could not use the V-ANDSF in VPLMN1 or VPLMN2, but should use the H-ANDSF. In this case, if there is available WLAN access network(s) according to WLANSP rule provided by HPLMN, then the UE attempts to connect to the available WLAN access network. If there is no available WLAN access network(s) according to WLANSP rule provided by HPLMN, then the UE may refer to WLANSP rule provided by the VPLMN to determine if there is available WLAN access network(s). Here, a case that there is no available WLAN access network(s) according to WLANSP rule provided by HPLMN may include a case that the UE requests to connect to a WLAN access network selected according to WLANSP rule provided by HPLMN but rejected (or refused, or failed) by a network node. A list of excluded or prohibited WLAN access network(s) may be included in the rejection message, and the UE may update the WLANSP rule with the list of excluded or prohibited WLAN access network(s). Here, the UE may basically use the WLANSP provided by HPLMN with using/reflecting/incorporating the WLANSP provided by VPLMN (especially using/reflecting/incorporating the list of excluded or prohibited WLAN access network(s)) to check for available WLAN access network(s). In other words, the WLANSP provided by HPLMN may be updated based on the list of excluded or prohibited WLAN access network(s) provided by VPLMN. Then the UE may check if there are available WLAN access network(s) based on the updated WLANSP rule (i.e., taking into account the list of excluded or prohibited WLAN access network(s)).

Additionally or alternatively, the UE may be configured to use WLANSP rule provided by VPLMN. The UE may use WLANSP rule provided by the VPLMN to determine if there is available WLAN access network(s). Here, the WLANSP rule provided by the VPLMN may include a list of excluded or prohibited WLAN access network(s).

The above embodiments are described with examples that a WLAN access network is a forbidden access or a restricted access, but the scope of the invention is not limited thereto. The above embodiments may be applicable to various granularity or various forms of WLAN access network classification, such as a limited access, a prohibited access, an excluded access, a non-recommended access.

The policies described above may include various policies not only defined in TS 23.402, TS 24.302, TS 24.312, but also will be defined in the future (e.g., policy including Hotspot 2.0 related information).

Figure 10:
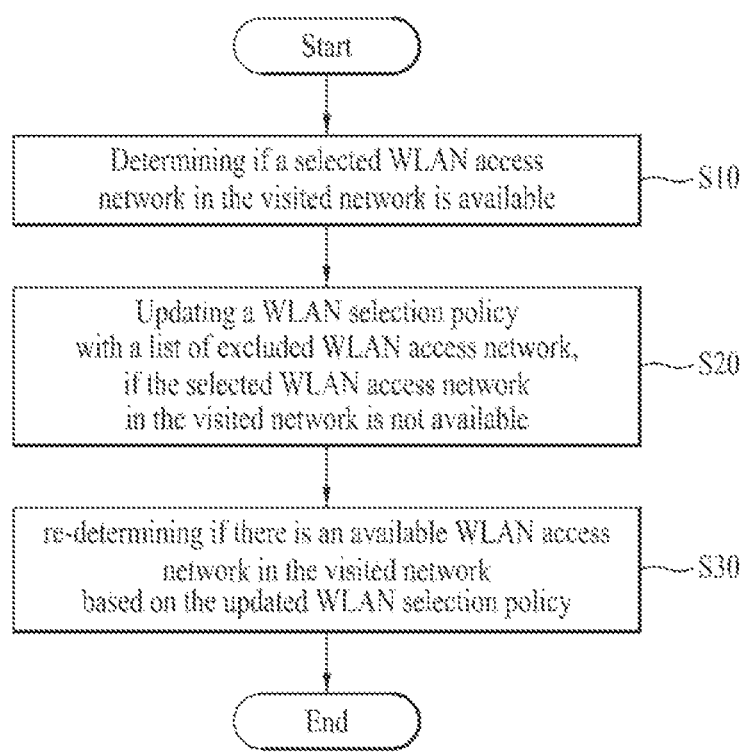
FIG. 10 is a flow diagram illustrating an exemplary method for access network selection in visited network according to the present invention.

FIG. 10 is a flow diagram illustrating an exemplary method for access network selection in visited network according to the present invention.

In the example of FIG. 10, it is assumed that UE may be configured with multiple valid WLAN selection policy (WLANSP) rules. For example, a UE may have valid rules from both a home network (e.g., HPLMN) and a visited network (e.g., VPLMN), when it is in a visited network (i.e., in roaming).

In step S10, the UE may determine if there is an available WLAN access network in the visited network. Here, the UE may be configured to use a WLANSP of the HPLMN for the determining step of S10. For example, the UE has simultaneous connectivity to multiple VPLMNs as in the example of FIG. 8, and has different VPLMN in 3GPP access and WLAN access, then the UE could not use the WLANSP provided by the V-ANDSF of VPLMN in 3GPP access or the WLANSP provided by the V-ANDSF of VPLMN in WLAN access, but should use the WLANSP provided by the H-ANDSF.

In step S20, the UE may update a WLANSP with a list of excluded (or forbidden, or restricted) WLAN access network(s) or with the selected WLAN access network but rejected, if the selected WLAN access network in the VPLMN is not available. Here, the WLANSP being updated in step S20 is basically a WLANSP of the HPLMN. In addition, the list of excluded WLAN access network(s) is provided by the VPLMN.

It may be determined that the selected WLAN access network in the VPLMN is not available, if a request of the UE for connecting to the selected WLAN access network in the VPLMN is rejected by the VPLMN. The UE may receive a rejection message from the VPLMN, if the request for connecting to the selected WLAN access network in the VPMN is rejected. The list of excluded WLAN access network(s) may be included in the rejection message, or may be provided to the UE by the V-ANDSF.

In step 30, the UE may re-determine if there is an available WLAN access network in the VPLMN based on the updated WLAN selection policy. Then, the UE may request a connection/association/access to a proper WLAN access network (i.e., a WLAN access network not matching the list of excluded WLAN access network(s)).

The exemplary method of FIG. 10 is described as a series of steps for clarity, but it is not a limitation of order of the steps and all or some of the steps may be performed simultaneously or in a different order. Further, not all of the steps described in the figures are necessary for implementing a scheme proposed by the present invention.

According to the embodiments of the present invention, efficient usage of network resources and enhanced user experiences are provided.

The above-described embodiments of the present invention may be independently applied or two or more of the above-described embodiments may be simultaneously applied.

Figure 11:
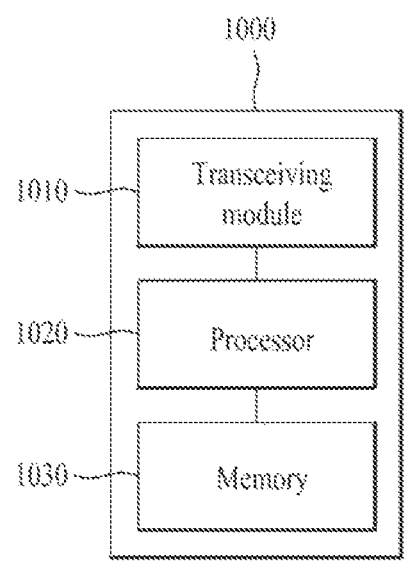
FIG. 11 is a diagram showing the configuration of an apparatus according to an exemplary embodiment of the present invention.

FIG. 11 is a diagram showing the configuration of an apparatus according to an exemplary embodiment of the present invention.

Referring to FIG. 11, the apparatus 1000 according to the present invention may include a transceiving module 1010, a processor 1020 and a memory 1030. The transceiving module 1010 may be configured to transmit various signals, data and information to an external device (e.g., a network node, UE, a server, etc.) and receive various signals, data and information from an external device (e.g., a network node, UE, a server, etc.). The processor 1020 may control overall operation of the apparatus 1000 and the apparatus 1000 may be configured to perform a function for processing information transmitted or received to or from an external device. The memory 1030 may store the processed information for a predetermined time and may be replaced by a buffer (not shown).

The apparatus 1000 may be implemented as a UE described in the present document. The processor 1020 may be configured to determine if there is an available WLAN access network in the visited network. The processor 1020 may be further configured to update a WLAN selection policy with a list of excluded WLAN access network(s), if the selected WLAN access network in the VPLMN is not available. The processor 1020 may be further configured to re-determine if there is an available WLAN access network in the visited network based on the updated WLAN selection policy.

The embodiments of the present invention may be independently or simultaneously applied to the detailed configuration of the apparatus 1000 and descriptions thereof will be omitted for clarity.

The embodiments of the present invention may be implemented by a variety of means, for example, hardware, firmware, software, or a combination thereof.

In the case of implementing the present invention by hardware, the present invention may be implemented with application specific integrated circuits (ASICs), Digital signal processors (DSPs), digital signal processing devices (DSPDs), programmable logic devices (PLDs), field programmable gate arrays (FPGAs), a processor, a controller, a microcontroller, a microprocessor, etc.

If operations or functions of the present invention are implemented by firmware or software, the present invention may be implemented in the form of a variety of formats, for example, modules, procedures, functions, etc. Software code may be stored in a memory unit so that it may be driven by a processor. The memory unit is located inside or outside of the processor, so that it may communicate with the aforementioned processor via a variety of well-known parts.

The detailed description of the exemplary embodiments of the present invention has been given to enable those skilled in the art to implement and practice the invention. Although the invention has been described with reference to the exemplary embodiments, those skilled in the art will appreciate that various modifications and variations may be made in the present invention without departing from the spirit or scope of the invention described in the appended claims. For example, those skilled in the art may use each construction described in the above embodiments in combination with each other. Accordingly, the invention should not be limited to the specific embodiments described herein, but should be accorded the broadest scope consistent with the principles and novel features disclosed herein.

The aforementioned embodiments are achieved by combination of structural elements and features of the present invention in a predetermined manner. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with other claims referring to the other claims other than the specific claims to constitute the embodiment or add new claims by means of amendment after the application is filed.

It will be apparent to those skilled in the art that various modifications and variations may be made in the present invention without departing from the spirit or scope of the inventions. Thus, it is intended that the present invention covers the modifications and variations of this invention provided they come within the scope of the appended claims and their equivalents.

The embodiments of the present invention are applicable to various mobile communication systems.

What is claimed is:

1. A method for selecting a Wireless Local Area Network (WLAN) access network by a user equipment (UE) in a visited public land mobile network (VPLMN), the method comprising:
    determining, by the UE based on a WLAN selection policy provided by a home public land mobile network (HPLMN), if a selected WLAN access network in the VPLMN is available and if the UE is configured to prefer WLAN selection policy provided by the HPLMN when both the HPLMN and VPLMN provide valid policies to the UE;
    updating, by the UE, the WLAN selection policy with a list of one or more excluded WLAN access networks, the list provided by the VPLMN, if the selected WLAN access network in the VPLMN is not available and if the UE is configured to prefer WLAN selection policy provided by the HPLMN when both the HPLMN and VPLMN provide valid policies to the UE; and
    re-determining, by the UE, if there is an available WLAN access network in the VPLMN based on the updated WLAN selection policy and if the UE is configured to prefer WLAN selection policy provided by the HPLMN when both the HPLMN and VPLMN provide valid policies to the UE.

2. The method of claim 1, wherein the list of one or more excluded WLAN access networks includes identification information of at least one WLAN access network.

3. The method of claim 2, wherein the at least one WLAN access network is configured as a forbidden access or a restricted access.

4. The method of claim 1, wherein the UE determines that the selected WLAN access network in the VPLMN is not available, if a request for connecting to the selected WLAN access network in the VPLMN is rejected.

5. The method of claim 4, wherein the UE receives a rejection message from the VPLMN, if the request for connecting to the selected WLAN access network in the VPLMN is rejected.

6. The method of claim 5, wherein the list of one or more excluded WLAN access networks is included in the rejection message.

7. The method of claim 1, wherein the WLAN selection policy of the HPLMN is provided by a home Access Network Discovery and Selection Function (H-ANDSF).

8. The method of claim 7,
    wherein the UE has simultaneous connectivity to multiple VPLMNs, and the UE uses different VPLMNs in each of a 3rd Generation Partnership Project (3GPP) access and a WLAN access, and
    wherein the UE uses the WLAN selection policy provided by the H-ANDSF, for the determining step, when the UE does not use a WLAN selection policy provided by a V-ANDSF of a VPLMN in the 3GPP access or a WLAN selection policy provided by a V-ANDSF of a VPLMN in the WLAN access.

9. The method of claim 1, wherein the WLAN selection policy of the VPLMN is provided by a visited Access Network Discovery and Selection Function (V-ANDSF).

10. A user equipment (UE) for selecting a Wireless Local Area Network (WLAN) access network in a visited public land mobile network (VPLMN), the UE comprising:
    a transceiving module; and
    a processor,
    wherein the processor is configured to:
        determine, based on a WLAN selection policy provided by a home public land mobile network (HPLMN), if the selected WLAN access network in the VPLMN is available and if the UE is configured to prefer WLAN selection policy provided by the HPLMN when both the HPLMN and VPLMN provide valid policies to the UE;
        update the WLAN selection policy with a list of one or more excluded WLAN access networks, the list provided by the VPLMN, if the selected WLAN access network in the VPLMN is not available and if the UE is configured to prefer WLAN selection policy provided by the HPLMN when both the HPLMN and VPLMN provide valid policies to the UE; and
        re-determine if there is an available WLAN access network in the VPLMN based on the updated WLAN selection policy and if the UE is configured to prefer WLAN selection policy provided by the HPLMN when both the HPLMN and VPLMN provide valid policies to the UE.

* * * * *